July 9, 1968  J. M. SHEESLEY  3,391,583
SKIP TOOTH ACTUATOR

Filed Aug. 3, 1966  3 Sheets-Sheet 1

John M. Sheesley
INVENTOR.

BY Robert W B [signature]

ATTORNEY

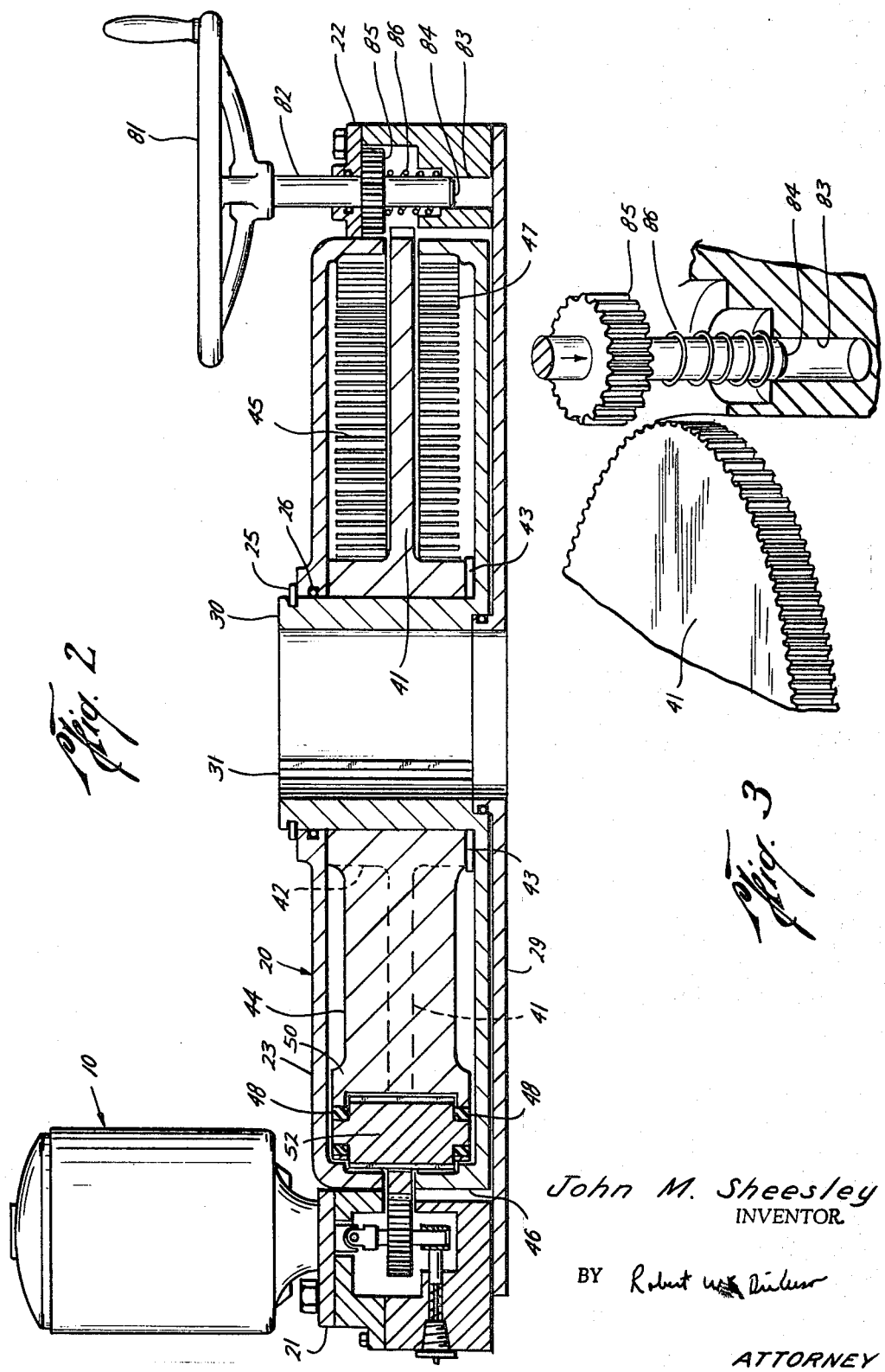

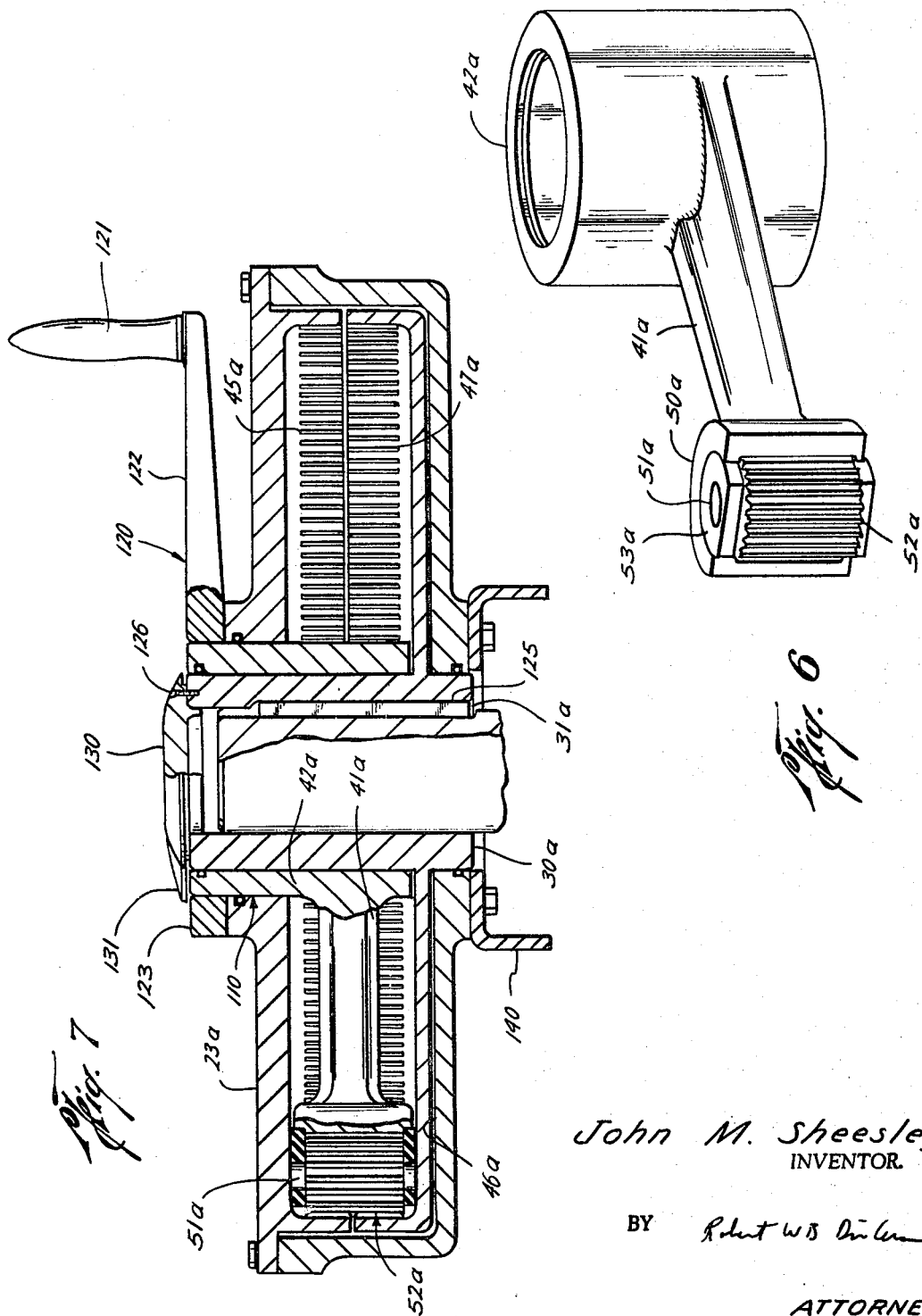

United States Patent Office 3,391,583
Patented July 9, 1968

3,391,583
SKIP TOOTH ACTUATOR
John M. Sheesley, P.O. Box 9365,
Houston, Tex. 77011
Filed Aug. 3, 1966, Ser. No. 569,960
7 Claims. (Cl. 74—626)

ABSTRACT OF THE DISCLOSURE

A device for rotating a shaft, the device having a pair of rotatable, internally toothed ring members. The ring members may be rotated manually or by mechanical and/or electrical means. The toothed members each have teeth of a different pitch from that of the other, such teeth being engageable with the teeth of a planetary gear which is associated with a shaft-engaging member.

---

This invention pertains to an actuator for translating high speed-low torque, rotary motion into lower speed-greater torque motion. More particularly, it permits a motor, in connection with a gearing system, to operate an associated valve or similar device.

While numerous devices in the past have been utilized to relate the rotary motion of a motor shaft to the necessary torque to move or rotate related heavy equipment, at least in connection with valve operated mechanisms, such prior efforts have encountered numerous difficulties. For example, if small sources of motive power, such as motors, were used, they oftentimes have been incapable of exerting sufficient torque to operate valve mechanisms. Further, if sufficient inertial and frictional forces were encountered, motor breakdown or stoppage has occurred. On such stoppages occurring, there has not normally been provided an alternate back-up system.

This invention basically includes a pinion gear associated with a motor shaft. Said pinion, in association with a mating spur gear causes a split ring gear in turn to cause a valve stem receiving means to rotate. This latter motion is directly caused by a rotatable planetary gear positioned with respect to said spur gear. Such operation is a proximate result of said ring gear having two sections one of which has a lesser number of teeth than the other. Further, fail safe means are provided wherein on said motor shaft encountering sufficient resistance, the motor may be shut down prior to being damaged. Additionally, means are provided for manual operation in case of power shut down or mechanical breakdown.

Thus, this invention has as an object the provision of a device wherein the rotative force of a motor may be translated into a higher torque force for rotating associated machinery.

Another object is the provision of means for automatically shutting down said motor in the event of encountering resistance above a certain level.

Yet another object is the provision of alternate means for rotating said associated machinery.

Still another object is permitting the manufacture of a motion translating system in a compact, economically operated unit.

These and numerous other objects and benefits will become obvious upon considering the following appended description and drawings in which:

FIGURE 2 is an elevation, partly in section, of the interior of the actuator;

FIGURE 3 is a perspective, parts thereof in section, of the gear and shaft portions of the alternate or back-up system;

FIGURE 6 is a perspective of the planetary gear portion of an embodiment; and

FIGURE 7 is a partly sectionalized, partly broken away elevation of the embodiment of FIGURE 6.

Figure 1:
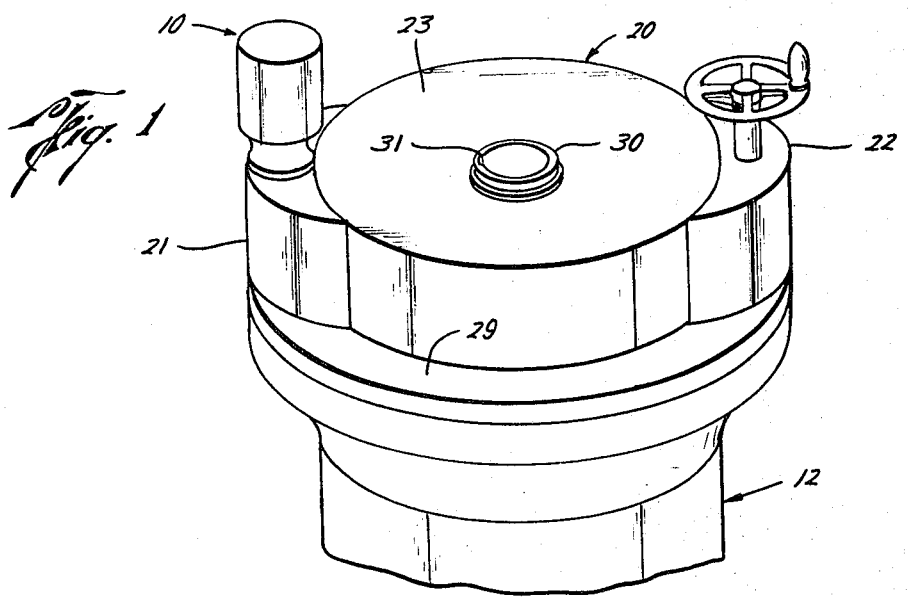
FIGURE 1 is a partly broken away perspective of the motor and housing for the actuator.

Consider first the representation of FIGURE 1. A motor housing 10, is shown affixed to shoulder 21 of actuator housing 20. Oppositely disposed from member 21 is a further shoulder 22 for housing the alternate system hereinafter described. Centrally located of cover 23 of housing 20, is rotatable collar 30, said collar having a key-type notch 31 for accommodating an insertable valve stem, of generalized valve 12.

Figure 4:
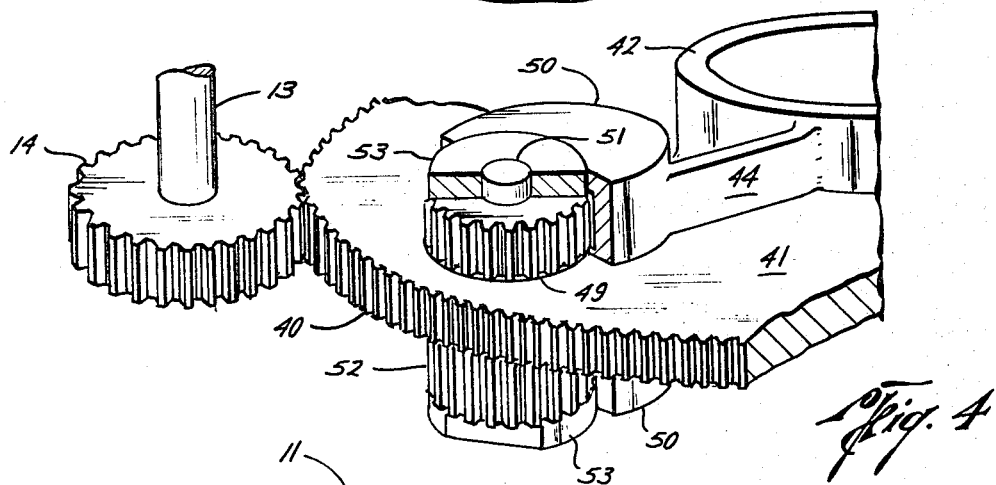
FIGURE 4 is a broken perspective of the pinion-spur-planetary gear arrangement of the actuator.
Figure 5:
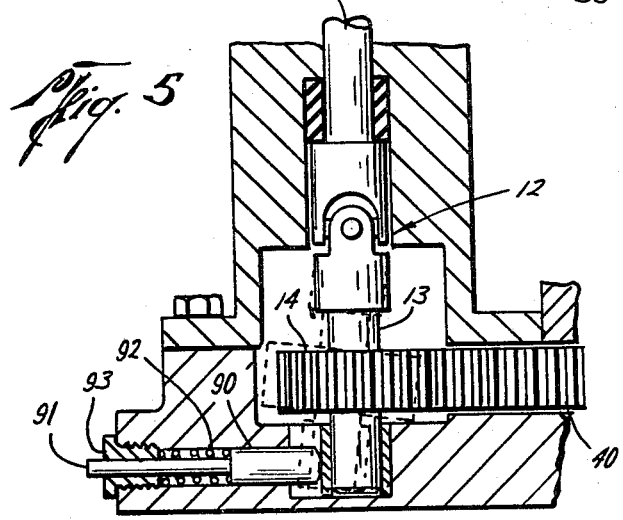
FIGURE 5 is a partly sectionalized elevation of the fail-safe assembly.

Looking now at FIGURES 2, 4 and 5, motor shaft 11 is seen to be linked to pinion shaft 13, by virtue of a universal joint assembly generally indicated as 12. Said shaft 13 has positioned thereon pinion gear 14. The teeth of pinion 14 mesh with the mating teeth of annular spur gear 40. The body portion 41 of spur gear 40 is seen to be linked to sleeve 42, said sleeve being rotatably mounted around collar 30, bearing stock 43 being provided intermediate said sleeve and the housing bottom.

Planetary gear housing 50 extends upwardly and downwardly of body 41 of spur 40, and is linked to sleeve 42 by arm 44. Said planetary housing 50 accommodates shaft 51 on which rides planetary gear 52. Said housing 50 further includes an extension 53 which serves as top and bottom covers for said planetary gear. Said latter gear is shown to pass through aperture 49 in spur 40, and bearing material being provided at 48.

Moving back to FIGURE 1, actuator housing 20 includes a fixed cover 23, with snap ring 25 and O-ring 26 between said cover and collar 30. Said cover 23 actually forms the upper half of a horizontally split ring gear, in that the interior surface of said cover is provided with teeth at 45 to mesh with the teeth on said planetary gear 52. The lower portion of the ring gear denominated 46 is also interiorly provided with teeth, as at 47. However, the number of teeth in lower portion 46 of the ring gear is different from, preferably greater, than in the upper portion, i.e., greater than on the interior surface of cover 23. Of course, a separate interiorly toothed disc could be used resting inside cover 23, however by providing said cover with teeth manufacture may be performed more economically. Thus, as spur gear 40 is caused to rotate, the teeth of planetary gear 52 will mesh with teeth 45 interior of fixed cover 23. Said planetary teeth, that is their lower reaches, will also tend to mesh with teeth 47 of rotatable ring gear 46. Inasmuch as there are a different number of teeth 47 than of fixed teeth 45, said ring gear portion 46 will be caused to rotate because of the force exerted by planetary gear 52 in causing the adjacent spaces between the teeth of 45 and 47, respectively, to be aligned. By providing said lower portion 46 with one more tooth than on the interior of cover 23, i.e., the pitch in member 46 being sufficiently lesser than on cover 23 to provide one more tooth on the interior surface of member 46 than on cover 23, then for each complete rotation of spur gear 40, lower portion 46 will be rotated the distance between adjacent teeth 47. This rotating motion will be transmitted to collar 30, which is integrally connected to ring portion 46, and thereby to a valve stem which may be affixed to collar 30 by virtue of key slot 31. Said collar may rest atop bottom plate 29, said plate being interiorly perforated so as to permit positioning of a valve stem within collar 30.

As shown in FIGURE 2, alternate operating means are provided for use in the event of power or motor failure.

A handle portion 81 is affixed to stem or shaft 82. Said shaft passes through an appropriate bored or drilled aperture in the upper surface of housing 22. Said housing is provided, toward its lower end with recess 83 for accommodating movable end 84 of stem 82. Intermediate end 84 and handle 81, pinion gear 85 being affixed to the shaft. Normally said pinion rests against the undersurface of the top of housing 22, being yieldingly held in this position by spring 86. However, on the exertion of sufficient downwardly directed force, handle 81, stem 82 and gear 85 may be forced in the same direction so that pinion 85 may have its teeth mesh with the teeth of spur gear 40. On rotating handle 81, pinion gear 85 will rotate said spur gear in the same manner as previously described, thus causing, by virtue of planetary gear 52, rotation of lower ring portion 46 by virtue of member 46 having more teeth than does the interior surface of cover 23. Obviously mechanical and/or electrical means may be utilized to rotate handle 81 if alternate or standby power sources are available.

FIGURE 5 best depicts the safety feature. Pinion 14 is seen to be positioned astride shaft 13, which is linked, by virtue of joint 12, to motor shaft 11. Resistive pressures from spur gear 40 tend to force said pinion outwardly or away from said spur gear. This may become especially apparent when extremely high torque is necessary to rotate an associated valve stem. Thus, said pinion 14 and its shaft 13, may yieldingly be moved to the left as shown in phantom lines. Plunger 90, supported on rod 91, is yieldingly held against the lower end of pinion shaft 13 by virtue of coiled spring 92, which presses against said plunger 90 and threaded plug 93. Said rod 91 may be operatively connected to a switch mechanism in a normal manner, which switch may cut off operation of motor 10 when sufficient forces are encountered, to endanger further motor operation.

Thus, it is seen that the high speed revolutions of a motor are translated by virtue of the pinion, spur and planetary gear interaction into a low speed high torque rotation of a ring gear. This is accomplished by utilizing the skip-tooth construction of this invention. By virtue of the lower section of the ring member having differently pitched teeth and independently rotatable from the upper portion of the ring member, and by virtue of the planetary gear meshing with both of said portions, said lower portion is caused to rotate a small distance during every revolution of the spur gear, said small rotation being transmitted to an associated valve stem.

Further, alternate operation is provided in that a disengageable, manually operable means may be engaged with said spur gear in the event of power or other failure.

Additionally, automatic cut-off means are provided to prevent motor damage in the event excessive forces resisting motor operation are encountered.

Another embodiment of this invention is shown by FIGURES 6 and 7, said embodiment being intended to be primarily manually operated. Numerals utilized in said FIGURES 6 and 7 are similar to those earlier used, suffixes being added for ease of identification. Fixed cover $23_a$ carries interior teeth $45_a$ and thereby forms the upper portion of a ring gear. Planetary gear $52_a$ is carried at one end of arm $41_a$, by virtue of planetary housing $50_a$, bearing $53_a$ being nested within said housing and shaft $51_a$ passing through an aperture in said bearing as well as through a communicating bearing in planetary gear $52_a$. The other end of arm $41_a$ is unitarily linked to sleeve $42_a$.

The lower portion of the ring gear is denominated $46_a$ and is interiorly threaded, as at $47_a$. As in the previously described embodiment, the number of gear teeth on the interior of member $46_a$ would be different in number, preferably greater, than on the interior of cover $23_a$, i.e., there are more of teeth $47_a$ than of $45_a$. Said lower portion $46_a$ of the ring gear forms an annular extension of rotatable sleeve $30_a$, which sleeve may be notched or have equivalent means for positioning interiorly therein, a valve stem, it being the purpose of the device to rotate said stem.

As is shown in FIGURE 7, fixed cover $23_a$ is apertured, as at 110 for receiving rotatable sleeve $42_a$. Said sleeve has positionable therearound at its upper end, handle means 120 including handle portion 121, lever arm 122, and ring member 123. Said ring member would be fixed relative to sleeve $42_a$ for rotation therewith. Rotatably received within sleeve $42_a$ is ring gear sleeve $30_a$, as shown. A valve stem key, such as 125, would be re-receivable within notch $31_a$ of sleeve $30_a$. Positioned atop sleeve $30_a$, linked thereto, and rotatable therewith, as by screw 126 is cover-indicator 130, having pointer portion 131 for indicating the relative position of a valve stem. Bracket assembly 140 provides means for affixing the actuator to a valve housing.

Operation would be similar to the earlier described embodiment. On rotating handle 121, sleeve $42_a$, arm $41_a$ and planetary gear $52_a$ would be rotated. The planetary gear teeth meshing with teeth $45_a$ and $47_a$ of the upper and lower portions, respectively, of the ring gear would cause gradual rotation of lower ring gear portion $46_a$, due to the pitch differential of the two portions. This rotation of member $46_a$ would be translated into rotation of a valve stem by virtue of sleeve $30_a$ being integral with ring gear portion $46_a$ and having the valve stem key insertable within notch $31_a$. Also, by virtue of pointer 130 being linked to skirt $30_a$, the rotation of an associated valve stem would be indexed.

Obviously, a further arm, similar to $41_a$, with a planetary gear attached thereto, similar to $52_a$, could be attached to sleeve $42_a$ opposite to the one shown in FIGURE 6. Such an arrangement, i.e., dual planetary gears would tend to balance reactive forces exerted against the planetary gear by the split ring gear.

Although limited embodiments of this invention have been described, it must be obvious that numerous modifications would be possible by one skilled in the art without departing from the spirit of the invention, the scope of which is intended to be limited only by the following appended claims.

I claim:
1. A valve operator including:
   motor mechanism;
   means for engaging a valve stem;
   means linking said motor to said engaging means;
   said linking means including (a) upper and lower internally toothed annular members of different pitch, one being non-rotatable and the other rotatable, (b) first gear means driven by said motor mechanism and rotatable about the axis of one of said annular members, (c) planetary gear means carried by said first gear means for meshing with both said upper and lower annular members and for causing said other member to rotate; and (d) said other member is linked to said engaging means.
2. The device of claim 1 wherein said rotatable toothed member has the lesser pitch.
3. The device of claim 1 wherein said linking means further includes a pinion carried by the shaft of said motor, and meshing with said first gear means.
4. The device of claim 1 and including motor control switch means, said switch means including a spring biased plunger adapted, on pressure being exerted thereagainst, to cause said motor to be shut off.
5. The device of claim 4 including disengageable manually operative means for rotating said valve portion.
6. A valve operator including:
   a motor;
   means for engaging a portion of a valve;
   means linking said motor to said engaging means, said linking means including adjacent toothed members, one of said members having a greater pitch than the other of said members; and manually operative means for causing rotation of said portion of said valve, said manually operative means including spring biased means for normally disengaging a pinion, included in said manually operative means, from a portion of said linking means.

7. A valve actuator including means rotatably engageable with a valve stem;

first and second internally toothed members, said second toothed member having a greater number of teeth than said first toothed member, one of said toothed members being integral with said engageable means;

planetary gear means that mesh with said first and second toothed members and thereby adapted to cause rotation of said toothed member that is integral with said engageable means; and handle means for rotating a lever arm, said arm carrying said planetary gear means.

References Cited
UNITED STATES PATENTS

| | | | |
|---|---|---|---|
| 1,948,709 | 2/1934 | Hackethal | 74—626 |
| 3,218,886 | 11/1965 | Bacchi et al. | 74—626 |
| 3,313,178 | 4/1967 | Saunders | 74—626 |

FRED C. MATTERN, Jr., *Primary Examiner.*

LEONARD H. GERIN, *Examiner.*